(12) United States Patent
Hsieh

(10) Patent No.: US 6,439,748 B1
(45) Date of Patent: Aug. 27, 2002

(54) OVERHEAD LAMP WITH AN UPWARDLY OPENING LAMP SHADE

(75) Inventor: Duan-Cheng Hsieh, Taipei (TW)

(73) Assignee: Habitek Corporation, Taipei (TW)

( * ) Notice: Subject to any disclaimer, the term of this patent is extended or adjusted under 35 U.S.C. 154(b) by 0 days.

(21) Appl. No.: 09/699,564

(22) Filed: Oct. 31, 2000

(51) Int. Cl.$^7$ ................................................ F21V 9/00
(52) U.S. Cl. ........................ 362/360; 362/361; 362/343; 362/413; 362/427; 362/431; 362/367; 362/370; 362/282
(58) Field of Search ................................ 362/218, 264, 362/270, 282, 350, 360, 431, 414, 367, 361, 343, 413, 427, 455

(56) References Cited

U.S. PATENT DOCUMENTS

| | | | |
|---|---|---|---|
| 5,184,891 A | 2/1993 | Shpigel | 362/419 |
| 5,339,233 A * | 8/1994 | Yang | 362/402 |
| 5,504,665 A | 4/1996 | Osteen et al. | 362/287 |
| 5,716,126 A | 2/1998 | Meyer | 362/287 |
| 5,924,789 A | 7/1999 | Thornton | 362/370 |
| 5,938,316 A * | 8/1999 | Yan | 362/260 |
| 6,015,221 A | 1/2000 | Bodell | 362/247 |
| 6,019,484 A | 1/2000 | Seyler | 362/287 |
| 6,217,195 B1 | 4/2001 | Turner et al. | 362/276 |
| 6,305,826 B1 * | 10/2001 | Yang | 362/351 |
| 6,322,234 B1 * | 11/2001 | Drake et al. | 362/276 |
| 6,361,184 B1 | 3/2002 | Hallgrimsson et al. | 362/188 |

* cited by examiner

*Primary Examiner*—Sandra O'Shea
*Assistant Examiner*—Anabel Ton
(74) *Attorney, Agent, or Firm*—Foley & Lardner

(57) ABSTRACT

An overhead lamp includes a base, a support post assembly, a bowl-shaped lamp shade, and a lamp unit. The support post assembly has an upper end, and a lower end that is fixed on the base. The bowl-shaped lamp shade includes an annular opaque peripheral shade member that is attached to the upper end of the support post assembly and that has an inner periphery and an outer periphery, and a light-permeable central shade member. The central shade member has an outer periphery that is attached to the inner periphery of the peripheral shade member. The outer periphery of the peripheral shade member defines an upper end opening of the lamp shade. The lamp unit is disposed within the lamp shade, and can illuminate surroundings of the overhead lamp via the upper end opening and the central shade member of the shade upon activation.

7 Claims, 7 Drawing Sheets

OVERHEAD LAMP WITH AN UPWARDLY OPENING LAMP SHADE

BACKGROUND OF THE INVENTION

1. Field of the Invention

The invention relates to a lamp, more particularly to an overhead lamp with an upwardly opening lamp.

2. Description of the Related Art

Referring to FIG. 1, a conventional overhead lamp 9 is shown to include a base 90, a support post assembly 92 which has a lower end fixed on the base 90, a bowl-shaped lamp shade 91 provided with an upwardly oriented reflective inner surface, an adjustment rod 94, a lamp unit 97 mounted within the lamp shade 91, and a cable 93 which has a first end electrically connected to the lamp unit 97 and a second end provided with a plug 931 that projects outwardly of the base 90 for insertion into a socket of a power source (not shown). The adjustment rod 94 has upper and lower ends respectively provided with upper and lower pivot units 98, 96 for coupling with the lamp shade 91 and the post assembly 92, respectively. An ON/OFF switch 95 is mounted on the post assembly 92, and is electrically connected to the cable 93.

Some disadvantages that result from the use of the conventional overhead lamp 9 are as follows:

(i) The aforesaid conventional overhead lamp is generally employed in places like photo studios, entertainment centers, night clubs and theatres. The illumination of the lamp unit 97 is oriented upward due to the reflective inner surface so as to be reflected downward from the ceiling, thereby providing an aesthetic and dim illumination around the conventional overhead lamp. However, the immediate vicinity underneath the conventional overhead lamp is darker than the ambient surrounding, thereby making the entire environment somewhat monotonous.

(ii) Heat dissipation of the conventional overhead lamp is poor, since air cannot pass through the lamp shade 91.

(iii) Since the lamp shade 91 is provided with an upper end opening, dirt and waste, like remains of insects, can collect within the lamp shade 91, thereby degrading the illumination of the lamp unit 97 upon long term use. The lamp shade 91 needs to be cleaned frequently, which annoys the user of the conventional overhead lamp 9.

SUMMARY OF THE INVENTION

Therefore, the main object of this invention is to provide an overhead lamp having a bowl-shaped lamp shade of a unique structure so as to provide a more attractive illumination of the ambient surrounding when a lamp unit in the lamp shade is activated.

A second object of the present invention is to provide an overhead lamp which includes an annular opaque peripheral shade member and a light-permeable central shade member mounted removably to an inner periphery of the peripheral shade member so as to permit flow of air through the peripheral shade member when the central shade member is removed from the peripheral shade member, thereby facilitating heat dissipation within the peripheral shade member.

A third object of the present invention is to provide an overhead lamp which is adapted to be cleaned easily for convenience of the user of the overhead lamp of the present invention.

Accordingly, an overhead lamp of the present invention includes a base, a support post assembly, a bowl-shaped lamp shade, and a lamp unit. The support post assembly has an upper end, and a lower end that is fixed on the base. The bowl-shaped lamp shade includes an annular opaque peripheral shade member that is attached to the upper end of the support post assembly and that has an inner periphery and an outer periphery, and a light-permeable central shade member. The central shade member has an outer periphery that is attached to the inner periphery of the peripheral shade member. The outer periphery of the peripheral shade member defines an upper end opening of the lamp shade. The lamp unit is disposed within the lamp shade, and is adapted to illuminate surroundings of the overhead lamp via the upper end opening and the central shade member of the lamp shade.

When the central shade member is removed from the peripheral shade member, air is permitted to flow through the peripheral shade member, thereby facilitating heat dissipation within the peripheral shade member.

BRIEF DESCRIPTION OF THE DRAWINGS

Other features and advantages of this invention will become more apparent in the following detailed description of a preferred embodiment of this invention, with reference to the accompanying drawings, in which.

DETAILED DESCRIPTION OF THE PREFERRED EMBODIMENT

Figure 1:
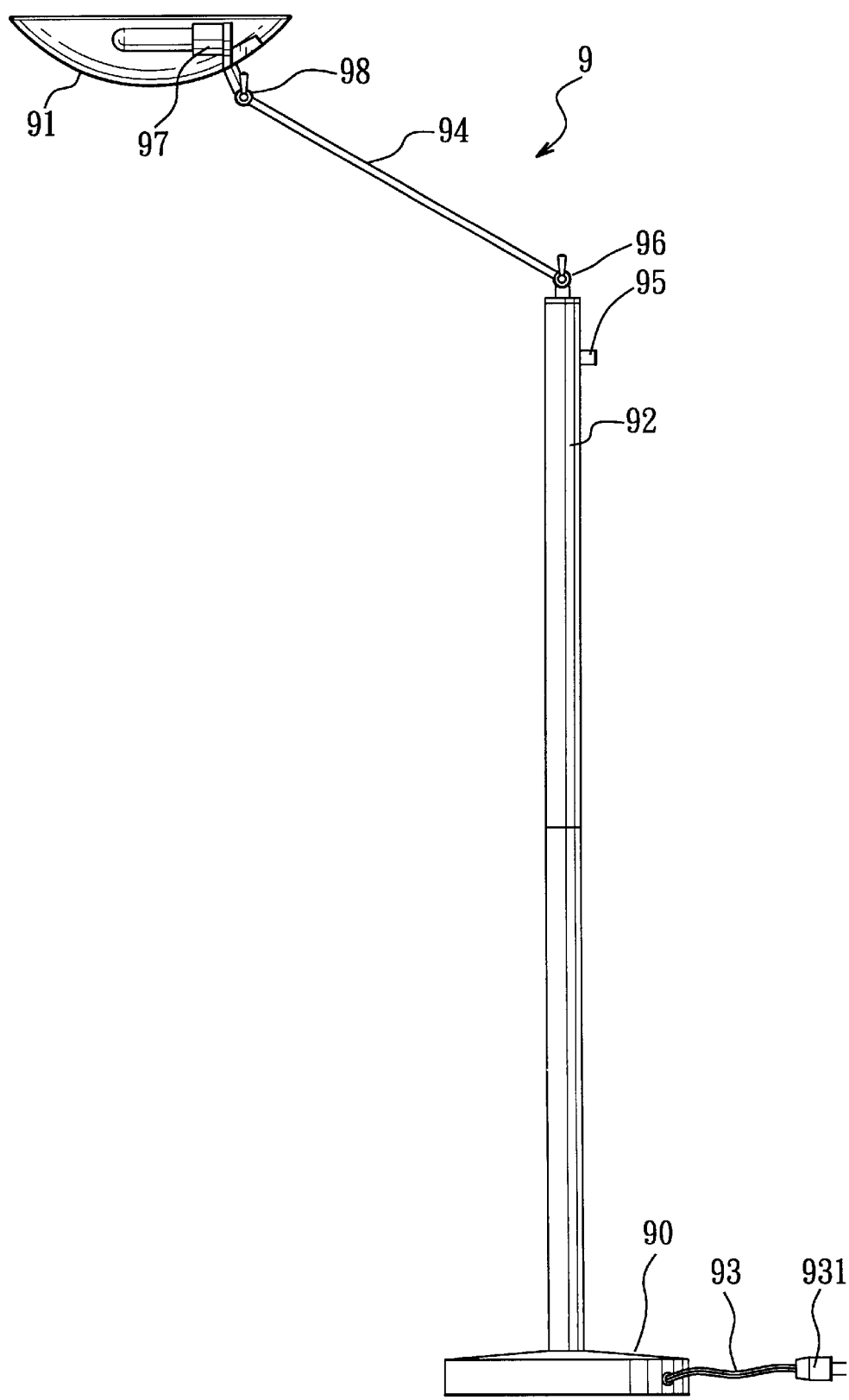
FIG. 1 is a schematic side view of a conventional overhead lamp.

Referring to FIGS. 2 to 6, the preferred embodiment of an overhead lamp according to the present invention is shown to include a base 10, a support post assembly 20, a bowl-shaped lamp shade 50, and a lamp unit 60.

As illustrated, the support post assembly 20 has an upper end, and a lower end that is fixed on the base 10.

The lamp shade 50 includes an annular opaque peripheral shade member 52 that is attached to the upper end of the support post assembly 20 and that has an inner periphery 522 and an outer periphery 523, and a light-permeable central shade member 54, which has an outer periphery 55 that is attached to the inner periphery 522 of the peripheral shade member 52. The outer periphery 523 of the peripheral shade member 52 defines an upper end opening 51 of the lamp shade 50.

The lamp unit 60 is disposed within the lamp shade 50, and is adapted to illuminate surroundings of the overhead lamp via the upper end opening 51 and the central shade member 54 of the lamp shade 50.

In the preferred embodiment, the central shade member 54 is mounted removably on the peripheral shade member 52. Thus, the central shade member 54 can be removed from the peripheral shade member 52 so as to permit flow of air through the peripheral shade member 52, thereby facilitating heat dissipation within the peripheral shade member 52. The peripheral shade member 52 is further formed with a cable-extension hole 53. The outer periphery 55 of the central shade member 54 is formed with a horizontally and outwardly extending flange 55'. The peripheral shade member 52 has a pressed clamping ring 524 which is bent inwardly relative to the inner periphery 522 of the peripheral shade member 52 in such a manner to form a void 568 therebetween such that the clamping ring 524 extends upwardly, radially and outwardly from the inner periphery 522 of the peripheral shade member 52.

The lamp shade 50 further includes a mounting ring plate 566, two press plates 562, and two bolts 564. The mounting ring plate 566 is of a generally Z-shaped cross-section, and has an inner periphery (566I) that is inserted into the void 568 so as to be clamped between the inner periphery 522 of the peripheral shade member 52 and the clamping ring 524, and two diametrically opposed threaded holes 567. Each of the press plates 562 is disposed on and above a respective one of the threaded holes 567 in the mounting ring plate 566 and the flange 55' of the central shade member 54. Each of the press plates 562 further has a bolt hole 565 formed therethrough. The bolts 564 extend through the bolt holes 565 in the press plates 562 to engage the threaded holes 567 in the mounting ring plate 566 so as to clamp the flange 55', of the central shade member 54 between the clamping ring 524 of the peripheral shade member 52 and the press plates 562, thereby fixing the peripheral shade member 52 around the central shade member 54.

Figure 7:
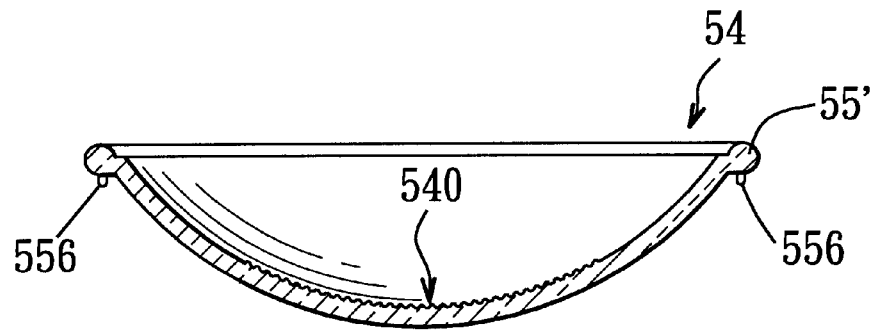
FIGS. 7 and 8 are side and top views of a modified light-permeable central shade member.

Referring to FIG. 7, the flange 55' of the central shade member 54 has a plurality of projections 556, which project integrally and downwardly to contact the clamping ring 524 (see FIG. 5) of the peripheral shade member 52 (see FIG. 5) to define a void between each adjacent pair of the projections 556 and between the central shade member 54 and the peripheral shade member 52(see FIG. 5), thereby permitting air flow therebetween. Thus, heat within the lamp shade 50 (see FIG. 5) is dissipated via the voids.

Figure 2:
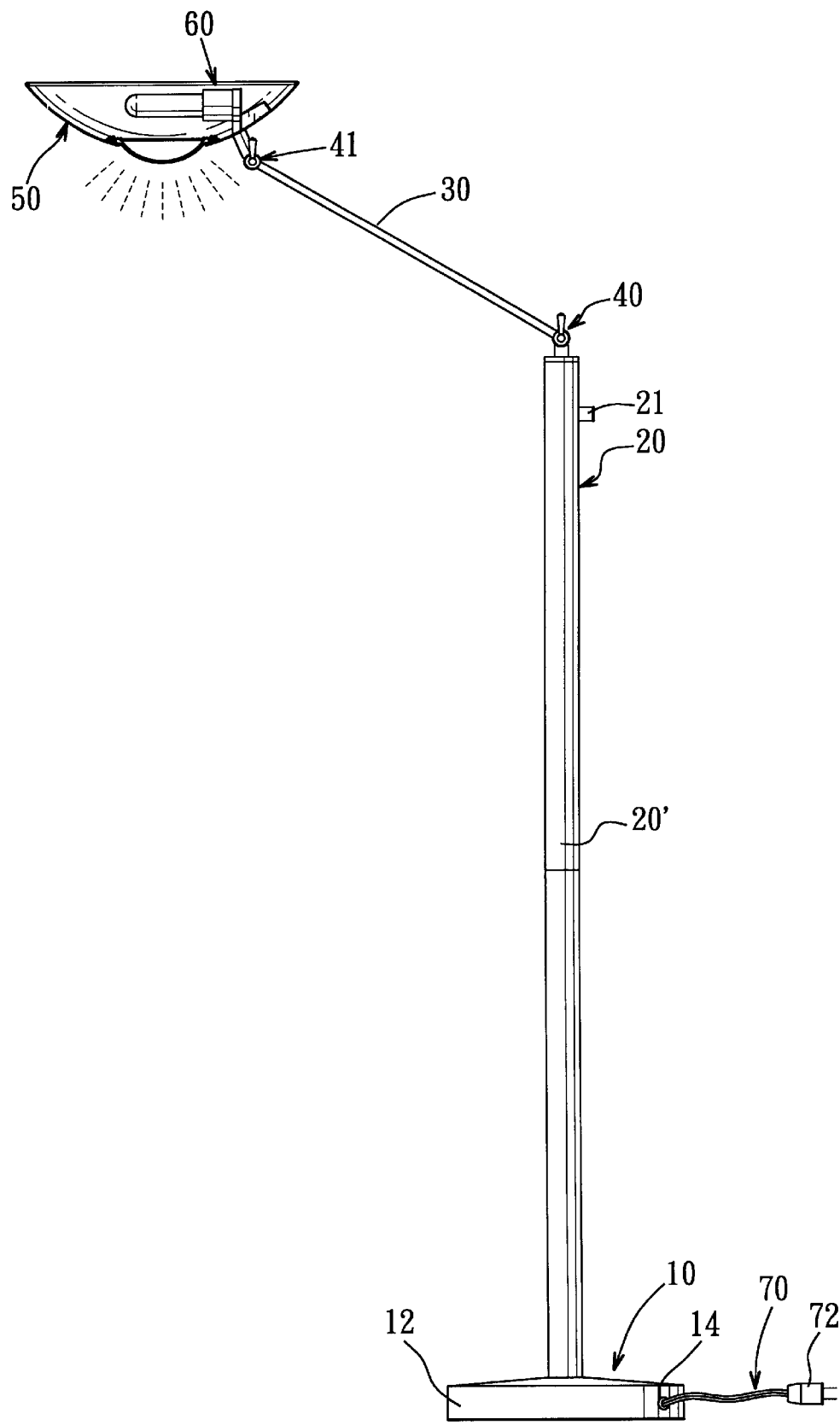
FIG. 2 is a schematic side view of a preferred embodiment of an overhead lamp according to the present invention.
Figure 3:
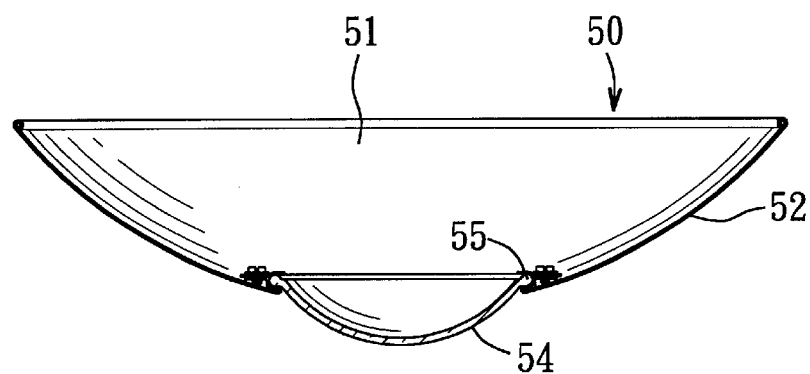
FIG. 3 is a sectional side view of a bowl-shaped lamp shade employed in the preferred embodiment shown in FIG. 2.
Figure 4:
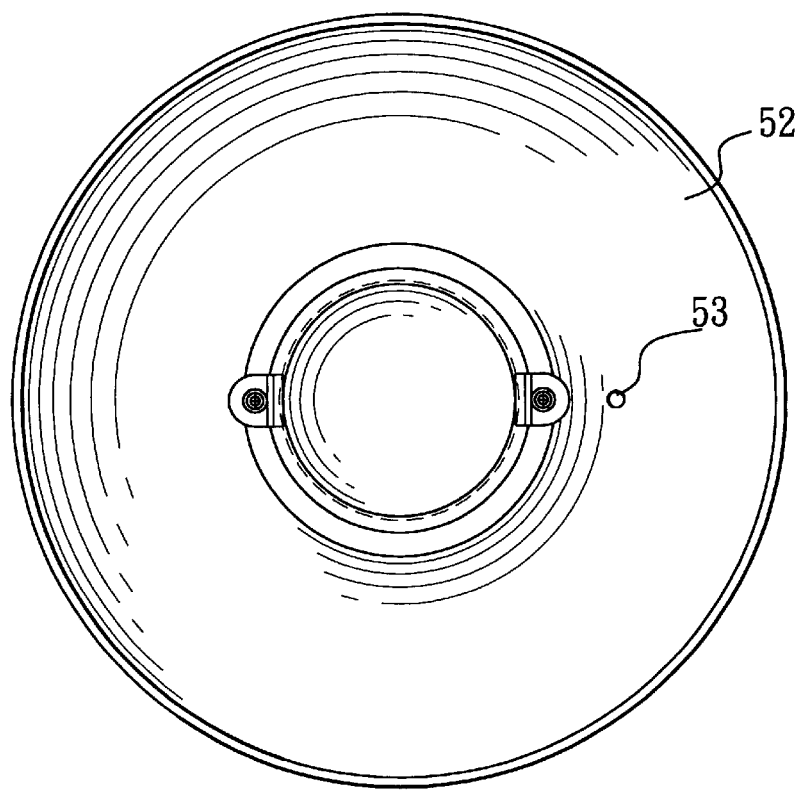
FIG. 4 is a top view of the bowl-shaped lamp shade employed in the preferred embodiment shown in FIG. 2.
Figure 5:
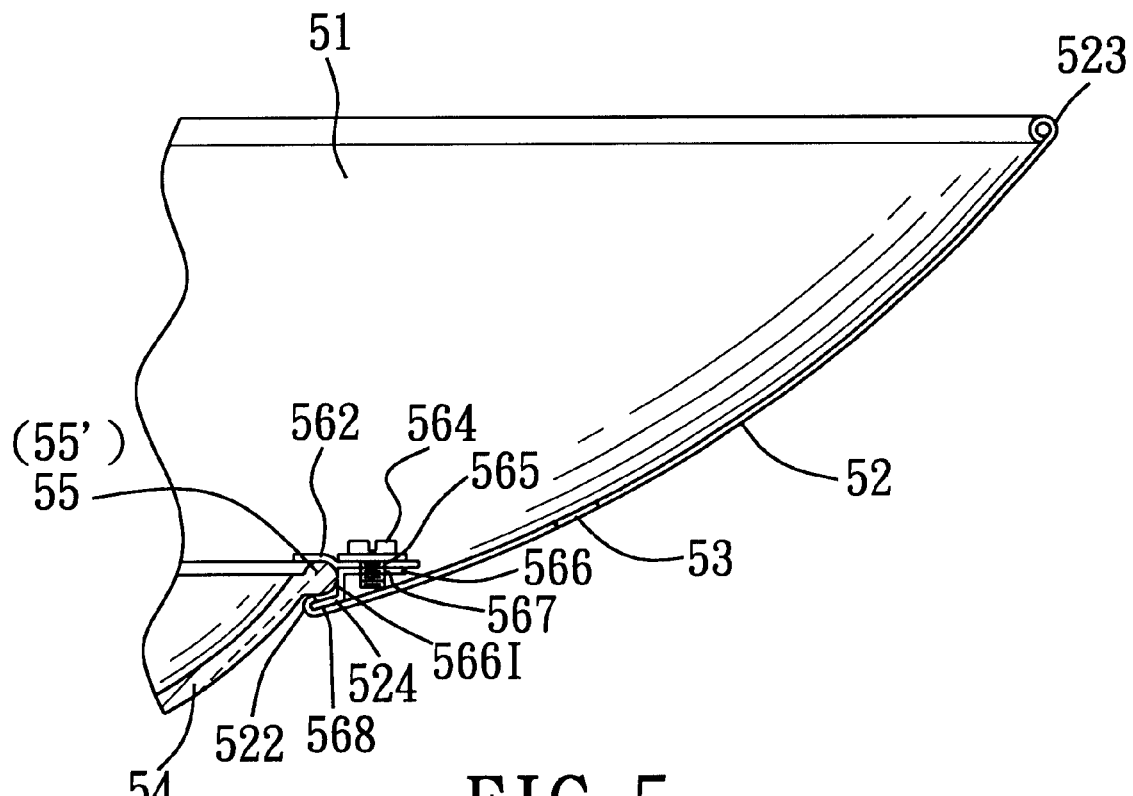
FIG. 5 is a fragmentary enlarged view of the bowl-shaped lamp shade employed in the preferred embodiment shown in FIG. 2.
Figure 6:
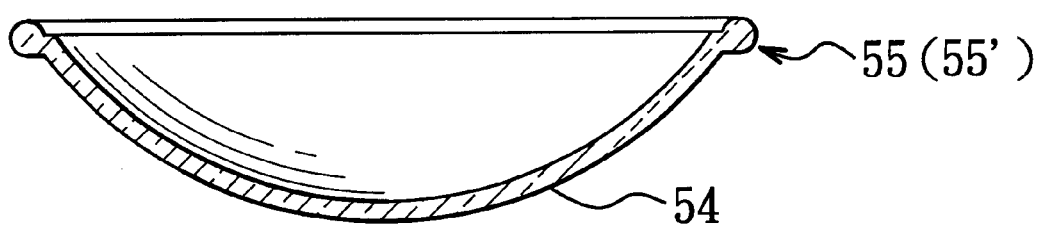
FIG. 6 is an enlarged view of a light-permeable central shade member shown in FIG. 3.
Figure 8:
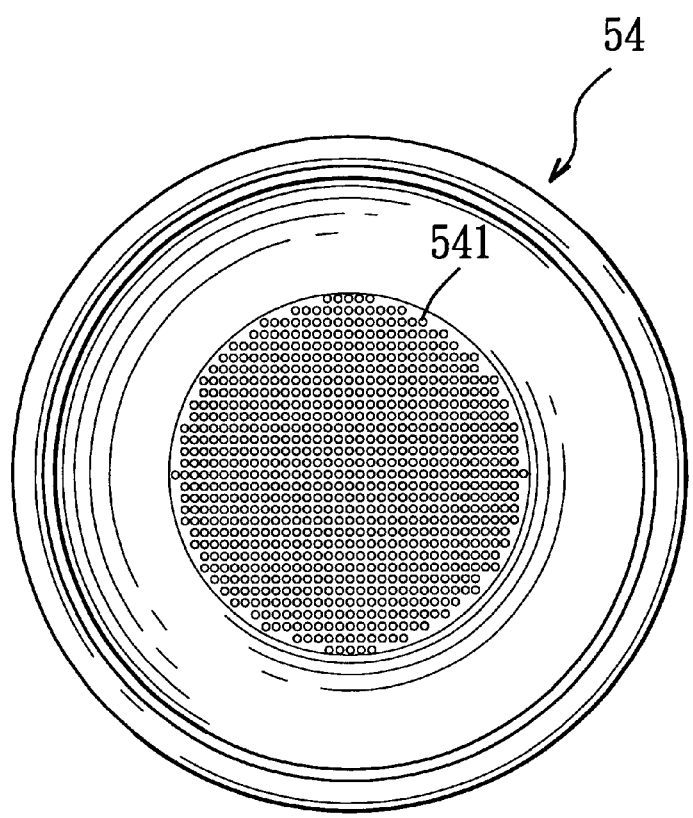

Referring to FIG. 8, the central shade member 54 has an upper surface 540 (see FIG. 7), which is formed with a plurality of evenly distributed projecting points 541 such that when light passes therethrough, reflection and deviation occur so as to enhance aesthetic illumination of the lamp unit 60 (see FIG. 2).

Referring again to FIG. 2, the base 10 includes a tubular housing 12, which has a peripheral wall that is formed with a cable hole 14 therethrough so as to be adapted to permit extension of an electrical cable 70 into the housing 12 and the support post assembly 20 via the cable hole 14. A plug 72 is provided at an outer end of the cable 70 for connection with a socket of a power source (not shown). The support post assembly 20 includes a post member 20' that is fixed on the base 10, an adjustment rod 30, a first pivot unit 40 for connecting the adjustment rod 30 pivotally to the post member 20', and a second pivot unit 41 for connecting the lamp shade 50 pivotally to the post member 20'.

Figure 9:
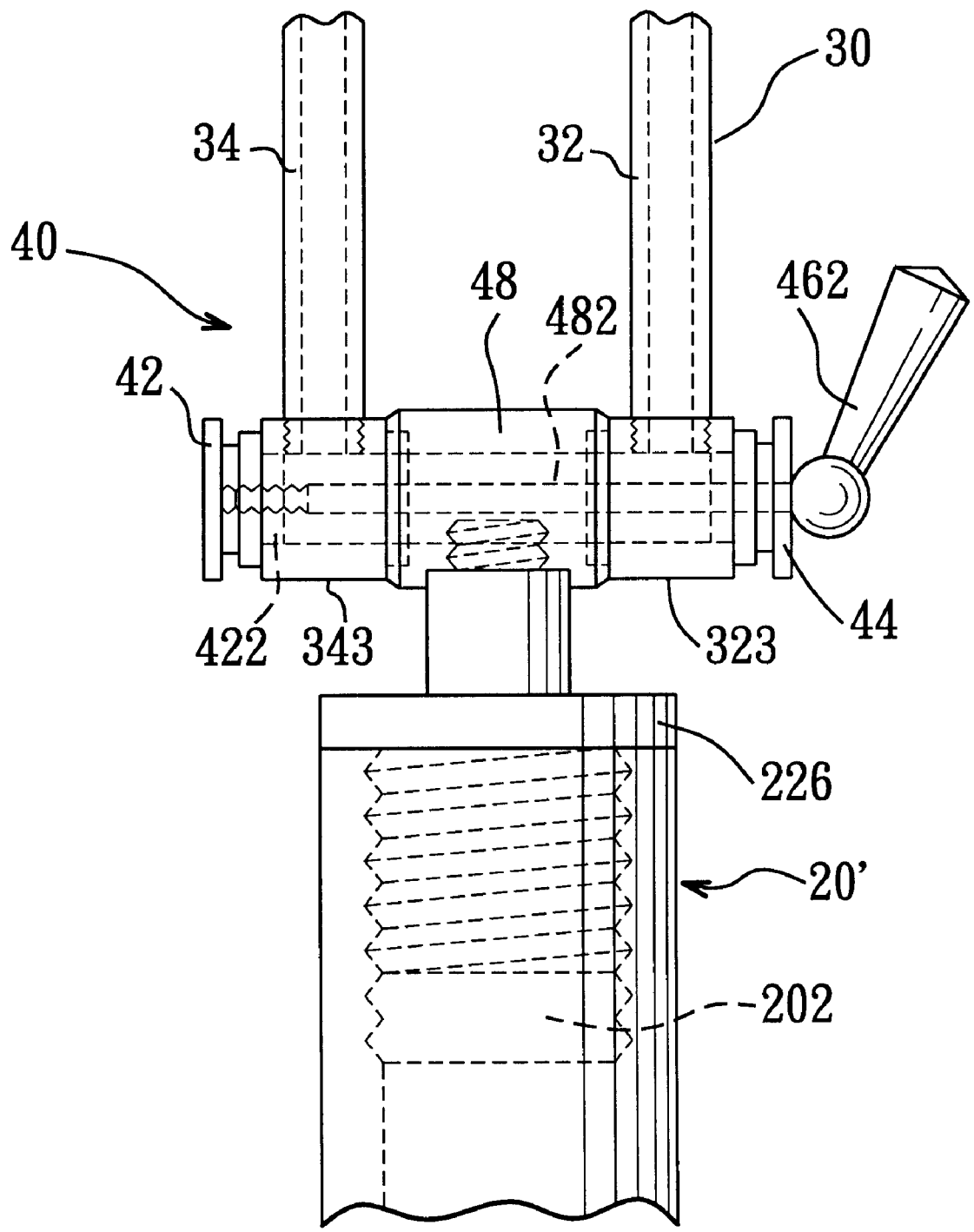
FIG. 9 is a fragmentary view of a portion of the preferred embodiment, illustrating connection between an adjustment rod and an upper end of a post member employed therein.
Figure 10:
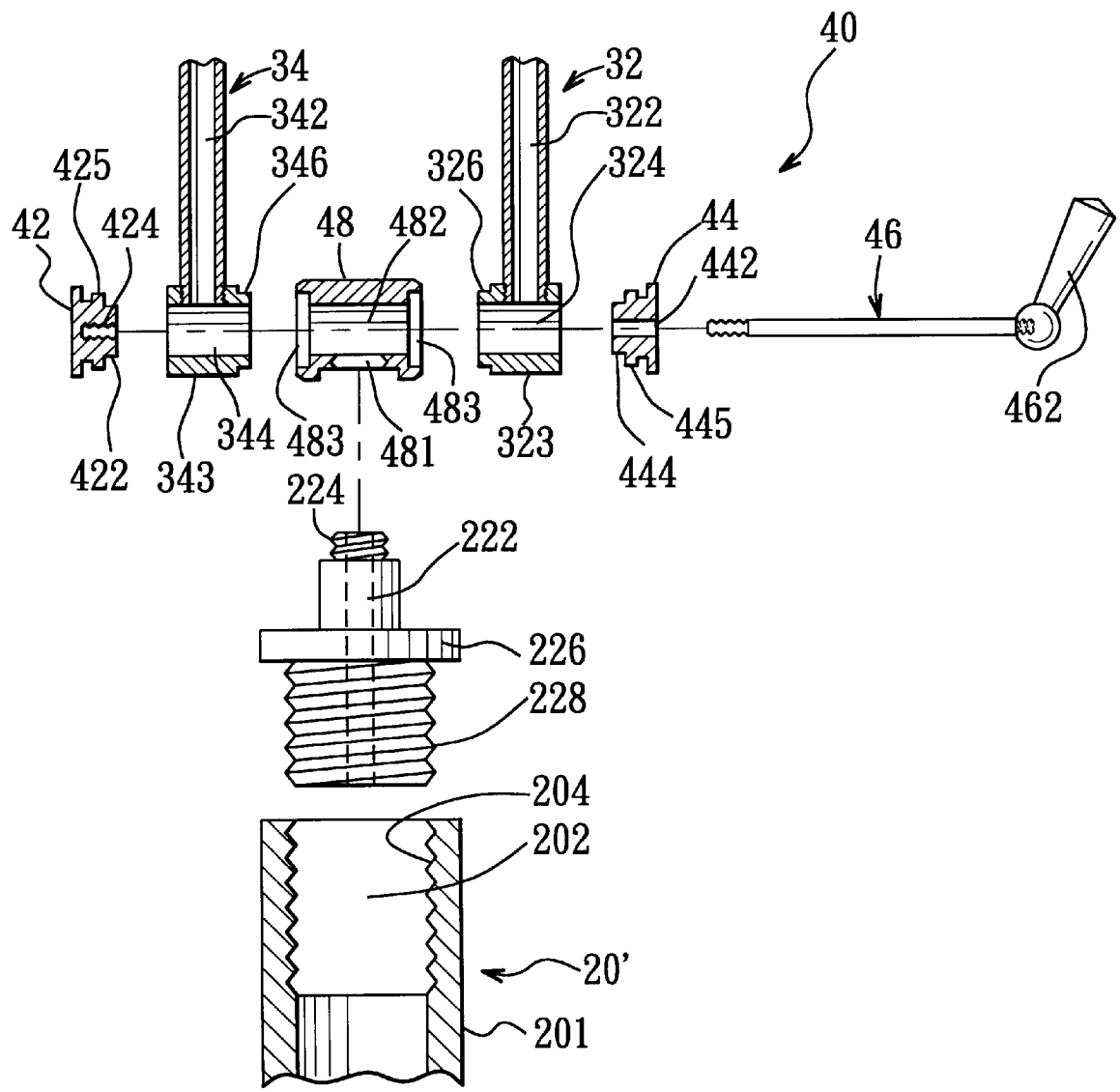
FIG. 10 is an exploded view of the portion in the preferred embodiment shown in FIG. 9.

As best shown in FIGS. 9 and 10, the adjustment rod 30 has a bifurcated end that is formed with two parallel tubular portions 32, 34. Each of the tubular portions 32, 34 of the adjustment rod 30 includes an end sleeve 323, 343 that is fixed thereto and that has a horizontal central hole 324, 344 formed therethrough, a uniform-diameter sleeve body 323', 343', and a diameter-reduced inner end 326, 346. The post member 20' has an upper end portion, which includes a tubular element 201 that is formed with an internally threaded upper end 204, and a connecting end piece 226 which has an externally threaded upper end 224 and an externally threaded lower end 228 that engages the internally threaded upper end 204 of the tubular element 201. The tubular element 201 and the connecting end piece 226 have central holes 202, 222, which are communicated with each other and which are adapted to permit extension of the electrical cable 70 therethrough. The first pivot unit 40 includes a horizontal bearing tube 48, a tubular inner clamping member 44, an outer clamping member 42, and a lock bolt 46. The bearing tube 48 has an axially extending central hole 482 and a radially extending threaded hole 481 that is communicated with the central hole 842 in the bearing tube 48 and that engages the externally threaded upper end 224 of the connecting end piece 226 of the post member 20' so as to fix the bearing tube 48 to the connecting end piece 226. The central hole 482 in the bearing tube 48 is adapted to permit extension of the electrical cable 70 from the central hole 222 in the connecting end piece 226 of the support post assembly 20 into the central hole 324, 344 in one of the end sleeves 323, 343 therethrough, and has a uniform-diameter hole body 482', and two diameter-increased opposite ends 483, which engage respectively and fittingly the diameter-reduced inner ends 326, 346 of the end sleeves 323, 343 of the adjustment rod 30. The inner clamping member 44 has a central hole 442 formed therethrough. The outer clamping member 42 has an end surface that is formed with a threaded hole 424 therethrough. The lock bolt 46 extends through the central holes in the inner clamping member 44, the right end sleeve 323, the bearing tube 48, and the left end sleeve 343 to engage the threaded hole 424 in the outer clamping member 42, thereby locking the adjustment rod 30 on the post member 20'. Under this condition, the lock bolt 46 can be loosened from the outer clamping member 44, thereby permitting rotation of the adjustment rod 30 relative to the post member 20'.

Preferably, a turning knob 462 is provided on an outer end of the lock bolt 46 in order to facilitate turning of the lock bolt 46. Each of the tubular portions 32,34 of the adjustment rod 30 has an externally threaded end. Each of the end sleeves 323,343 has a radial threaded hole that engages a respective one of the externally threaded ends of the tubular portions 32,34 of the adjustment rod 30 and that is communicated with a respective one of the central holes 324,344 in the end sleeves 323,343 so as to be adapted to permit extension of the electrical cable 70 through one of the end sleeves 323,343. Each of the inner and outer clamping members 44,42 has an insert end 424,444 that is inserted forcibly into a respective one of the central holes 324,344 in the end sleeves 323,343 of the adjustment rod 30, and an outward flange 425,445 that extends radially and outwardly from an intermediate portion thereof and that abuts against an end surface of a respective one of the end sleeves 323,343, thereby positioning the inner and outer clamping members 44,42 relative to the end sleeves 323,343.

With this invention thus explained, it is apparent that numerous modifications and variations can be made without departing from the scope and spirit of this invention. It is therefore intended that this invention be limited only as indicated in the appended claims.

I claim:

1. An overhead lamp comprising:

a base;

a support post assembly having an upper end, and a lower end that is fixed on said base;

a bowl-shaped lamp shade including an annular opaque peripheral shade member that is attached to said upper end of said support post assembly and that has an inner periphery and an outer periphery, and a light-permeable central shade member, which has an outer periphery that is attached to said inner periphery of said peripheral shade member, said outer periphery of said peripheral shade member defining an upper end opening of said lamp shade; and a lamp unit disposed within said lamp shade and adapted to illuminate surroundings of said overhead lamp via said upper end opening and said central shade member of said lamp shade, wherein said central shade member is mounted removably on said peripheral shade member, whereby, said central shade member can be removed from said peripheral shade member so as to permit flow of air through said peripheral shade member, thereby facilitating heat dissipation within said peripheral shade member, and wherein said outer periphery of said central shade member is formed with a horizontally and outwardly extending flange, said inner periphery of said peripheral shade member being formed with a pressed clamping ring that extends upwardly, radially and outwardly therefrom, said lamp shade further including:

a mounting ring plate, which has a generally Z-shaped cross-section, an inner periphery that is clamped between said inner periphery of said peripheral shade member and said clamping ring, and two diametrically opposed threaded holes;

two press plates, each of which is disposed on and above a respective one of said threaded holes in said mounting ring plate and said flange of said central shade member, each of said press plates having a hole formed therethrough; and two bolts extending through said holes in said press plates to engage said threaded holes in said mounting ring plate so as to clamp said flange of said central shade member between said clamping ring of said peripheral shade member and said press plates, thereby fixing said peripheral shade member around said central shade member.

2. The overhead lamp as defined in claim 1, wherein said flange of said central shade member has a plurality of projections, which project integrally and downwardly to contact said clamping ring of said peripheral shade member to define a void between each adjacent pair of said projections and between said central shade member and said peripheral shade member, thereby permitting air flow therebetween.

3. The overhead lamp as defined in claim 1, wherein said central shade member has an upper surface, which is formed with a plurality of evenly distributed projecting points.

4. The overhead lamp as defined in claim 1, wherein said base includes a housing, which has a wall that is formed with a cable hole therethrough so as to be adapted to permit extension of an electrical cable into said housing and said support post assembly via said cable hole.

5. An overhead lamp comprising:

a base;

a support post assembly having an upper end, and a lower end that is fixed on said base;

a bowl-shaped lamp shade including an annular opaque peripheral shade member that is attached to said upper end of said support post assembly and that has an inner periphery and an outer periphery, and a light-permeable central shade member, which has an outer periphery that is attached to said inner periphery of said peripheral shade member, said outer periphery of said peripheral shade member defining an upper end opening of said lamp shade; and a lamp unit disposed within said lamp shade and adapted to illuminate surroundings of said overhead lamp via said upper end opening and said central shade member of said lamp shade, wherein said base includes a housing, which has a wall that is formed with a cable hole therethrough so as to be adapted to permit extension of an electrical cable into said housing and said support post assembly via said cable hole, and wherein said support post assembly includes a post member that is fixed on said base, an adjustment rod, a first pivot unit for connecting said adjustment rod pivotally to said post member, and a second pivot unit for connecting said lamp shade pivotally to said post member, said adjustment rod having a bifurcated end that is formed with two parallel tubular portions, each of said tubular portions of said adjustment rod including an end sleeve that is fixed thereto and that has a horizontal central hole formed therethrough, a uniform-diameter sleeve body, and a diameter-reduced inner end, said post member having an upper end portion, which includes a tubular element that is formed with an internally threaded upper end, and a connecting end piece which has an externally threaded upper end and an externally threaded lower end that engages said internally threaded upper end of said tubular element, said tubular element and said connecting end piece having central holes, which are communicated with each other and which are adapted to permit extension of the electrical cable therethrough, said first pivot unit including:

a horizontal bearing tube having an axially extending central hole and a radially extending threaded hole that is communicated with said central hole in said bearing tube and that engages said externally threaded upper end of said connecting end piece of said post member so as to fix said bearing tube to said connecting end piece, said central hole in said bearing tube being adapted to permit extension of the electrical cable from said central hole in said connecting end piece of said support post assembly into said central hole in one of said end sleeves therethrough and having a uniform-diameter hole body, and two diameter-increased ends, which engage respectively and fittingly said diameter-reduced ends of said end sleeves of said adjustment rod;

a tubular inner clamping member having a central hole formed therethrough;

an outer clamping member having an end surface that is formed with a threaded hole therethrough; and a lock bolt extending through said central hole in said inner clamping member, one of said end sleeve to engage said threaded hole in said outer clamping member, thereby locking said adjustment rod on said post member;

whereby, said lock bolt can be loosened from said outer clamping member, thereby permitting rotation of said adjustment rod relative to said post member.

6. The overhead lamp as defined in claim 5, wherein each of said tubular portions of said adjustment rod has an externally threaded end, each of said end sleeves having a threaded hole that engages a respective one of said externally threaded ends of said tubular portions of said adjustment rod and that is communicated with a respective one of said central holes in said end sleeves so as to be adapted to permit extension of the electrical cable through one of said end sleeves.

7. The overhead lamp as defined in claim 5, wherein each of said inner and outer clamping members has an insert end that is inserted into a respective one of said central holes in said end sleeves of said adjustment rod, and an outward flange that extends radially and outwardly from an intermediate portion thereof and that abuts against an end surface of a respective one of said end sleeves, thereby positioning said inner and outer clamping members relative to said end sleeves.

* * * * *